United States Patent [19]

Boetzkes

[11] Patent Number: 4,752,053
[45] Date of Patent: Jun. 21, 1988

[54] RAILWAY VEHICLE MOTION DETECTOR
[75] Inventor: Peter C. Boetzkes, North Vancouver, Canada
[73] Assignee: DSL Dynamic Sciences Limited, St. Laurent, Canada
[21] Appl. No.: 624,023
[22] Filed: Jun. 25, 1984
[51] Int. Cl.$^4$ .............................................. G06F 15/48
[52] U.S. Cl. ............................. 246/167 R; 246/182 R
[58] Field of Search ..................... 340/670, 683, 407; 246/167 R, 169 R, 187 B, 187 C, 182 B, 182 R, 7, 121; 73/517 R, 654, 503, 517 AV, DIG. 1; 310/329; 324/165

[56] References Cited

U.S. PATENT DOCUMENTS

| | | | |
|---|---|---|---|
| 3,714,538 | 1/1973 | Albrecht et al. | 340/670 |
| 3,858,064 | 12/1974 | Schissler | 310/329 |
| 3,937,152 | 2/1976 | Nilsson et al. | 340/683 |
| 4,017,044 | 4/1977 | Anderson et al. | 246/187 B |
| 4,179,739 | 12/1979 | Virnot | 246/3 |
| 4,181,943 | 1/1980 | Mercer et al. | 246/182 B |
| 4,207,569 | 6/1980 | Meyer | 246/7 |
| 4,326,143 | 4/1982 | Guth et al. | 310/329 |

FOREIGN PATENT DOCUMENTS 2924190 12/1980 Fed. Rep. of Germany ... 246/182 R

Primary Examiner—John W. Caldwell, Sr.
Assistant Examiner—Alvin Oberley
Attorney, Agent, or Firm—Christensen, O'Connor, Johnson & Kindness

[57] ABSTRACT

A railway vehicle motion detector that monitors vibrations within the vehicle and the acceleration thereof to provide an indication of the condition of motion of the vehicle. The motion detector is adapted to be mounted on any railway vehicle, and in particular on the last vehicle of a railway train, and to be incorporated into a system that monitors and remotely displays a plurality of train status conditions. The motion detector includes a transducer (10) that converts the vehicle vibrations and acceleration into an electrical output signal. A velocity circuit (12) selectively passes and integrates a range of frequencies of the transducer output signal that are reliable indicators of vehicle motion to obtain a velocity signal having a magnitude that is proportional to a change in the velocity of the vehicle and a polarity that is indicative of the direction of a change in velocity. The transducer output signal is also processed by a vibration circuit (14) to derive a vibration signal that is proportional to the magnitude of vibrations within the vehicle. When integrated into a remote monitoring and display system, a programmed microcomputer (17) repetitively monitors the velocity signal and the vibration signal to determine the condition of motion of the vehicle. This information is then made available for inclusion in a report that is transmitted to a remote display unit and presented for use by an operator.

14 Claims, 8 Drawing Sheets

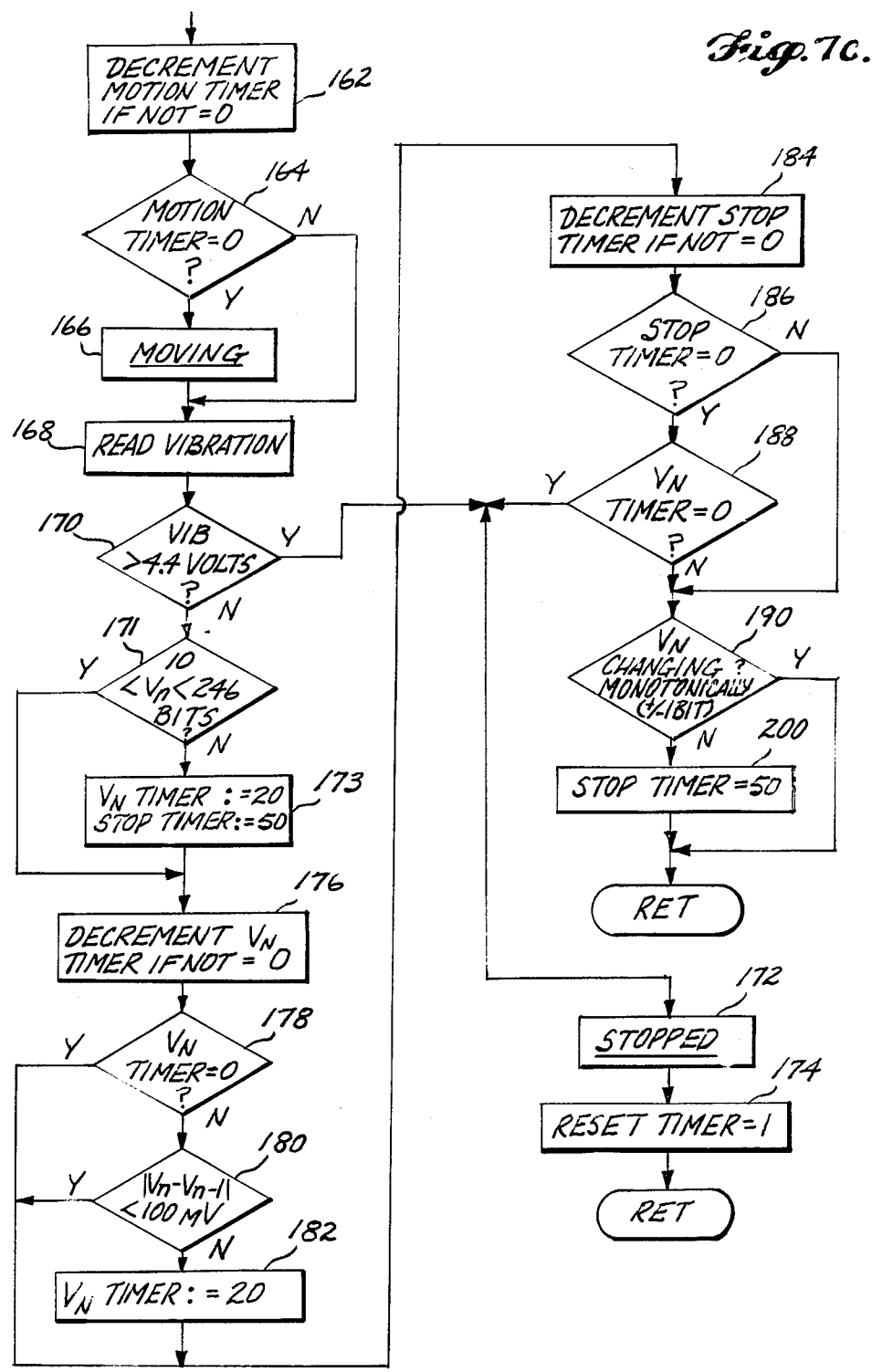

RAILWAY VEHICLE MOTION DETECTOR

BACKGROUND OF THE INVENTION

The present invention relates generally to a system for detecting the motion of a vehicle. More particularly, the invention concerns a motion detector that provides an indication of various states or conditions of motion of a railway vehicle by monitoring both vibrations within the vehicle and the acceleration thereof.

In railway systems, such as those employing locomotive-drawn trains, it is difficult for the engineer or other operator to reliably be apprised of the state of motion of vehicles that are located remotely from him. For example, when starting a train from a stopped condition, it is particularly difficult for the train driver to known when the driving force of the locomotive has propagated through the interconnected cars and accelerated the last vehicle into motion. Conversely, when coming to a stop, it is difficult for the driver to know when the last car has been decelerated to a standstill. Knowledge of these conditions of motion of the last vehicle is extremely useful to the driver in controlling operation of the train. Since, in the normal operation of a train, it is not uncommon for the train to reverse directions at low speeds, it is important that the driver know when the last car has undergone the desired change in motion as, for example, from reverse to forward.

When the train is in full motion, individual vehicles and groups of vehicles undergo changes in velocity as uphill and downhill grades are negotiated. These changes occur at differing intervals and affect how the driver controls the train. The condition in which one car is being "pulled" by an adjacent car is referred to as "draft", while the condition in which a car is "pushed" by an adjacent car is referred to as "buff". Reliable information concerning these conditions would be very useful to the train driver.

Heretofore, no means have been developed for reliably and continuously detecting the motion of remote rail vehicles. The use of Doppler effect radar has been proposed as one such means. While potentially enabling precise velocity measurement, a Doppler effect radar suffers from a number of practical problems when utilized as a rear-of-train motion detector. For antennas of reasonable size, the radiation pattern is so broad that passing trains or other vehicles produce large spurious outputs. Even if a more highly directional antenna were possible, passing trains would still yield spurious outputs on curved sections of track. It is also difficult to adequately shield a microwave antenna of small dimensions from the effects of rain, snow, and ice so that transmission and reception are not seriously compromised. Lastly, transmitters for ten gigahertz, which are normally used in this application, draw significant power. This is particularly disadvantageous where it is desired to position the velocity detector on a vehicle where little power is available.

The sensing of vibrations is a generally known means for detecting motion. For example, some commercially available accelerometers employ the piezoelectric effect to generate signals that are indicative of vibration. However, a number of problems are encountered in attempting to provide a device that relies upon vibrations within a vehicle to indicate differing states of motion. First, there is a significant problem of adequately discriminating between vibrations resulting from movement of the subject vehicle and those resulting from other mechanisms such as a passing train. If the vibrations resulting from a passing train are to be rejected, sensitivity of the sensor must be set so low that vibrations of the subject car may also be rejected. This is particularly problematic, since the sensor would frequently indicate a "stop" condition while the subject car is indeed moving, such as at a low speed on smooth rail. Conversely, a high-sensitivity sensor that can reliably detect even slow motion on smooth rail will almost invariably also detect passing trains and similar sources of vibration external to the subject vehicle.

Secondly, reliance upon vibration sensing presents difficulties when employed on a vehicle equipped with an onboard engine, such as a diesel engine for a refrigerated car. In such an application, it is difficult to yield a reliable change in output signal corresponding to vehicle motion since the onboard engine vibration is of such amplitude and frequency spectrum as to effectively mask the motion-indicating vibrations.

Thirdly, given the inherent nondirectionality of vibration sensing, it is difficult to differentiate between forward and reverse motion. As noted above, this indication of direction can be very useful to the train driver.

SUMMARY OF THE INVENTION

The present invention provides an arrangement that overcomes the above-described problems of reliably obtaining an indication of vehicle motion. In particular, an important aspect of the invention is the recognition that neither sensing vibrations within the vehicle nor sensing changes in the velocity of the vehicle is, considered separately, a reliable basis for determining the state of motion of a railway vehicle. A further aspect of the invention is the recognition that, despite the inherent problems associated with sensing either vibrations or velocity change alone, reliable determinations of vehicle motion can be obtained by sensing and interpreting these parameters in combination with one another. In furtherance of this realization, the present invention provides a motion detector which senses a wide spectrum of mechanical movement of and within a railway vehicle, which selects therefrom the movements which are associated with motion-related vibrations and vehicle acceleration, and which utilizes characteristics of the selected movements to indicate whether the vehicle is stopped, in motion, or undergoing a change in direction of motion.

In accordance with the invention, there is provided a motion detector that is adapted to be mounted on a railway vehicle. The detector includes means for providing an electrical output signal that is proportional to vibrations within the vehicle and proportional to the magnitude and direction of acceleration of the vehicle. In preferred form, the electrical output signal corresponding to the vehicle vibrations and acceleration is provided by a single piezoelectric transducer. Alternately, separate transducers can be employed to provide two independent signals, one of which is proportional to vibration and one of which is proportional to acceleration.

The motion detector further includes means responsive to the electrical output signal for providing a velocity signal having a magnitude that is proportional to a change in the velocity of the vehicle and having a polarity that is indicative of the direction of a change in velocity. The motion detector further includes means responsive to the electrical output signal for providing a vibration signal that is proportional to the magnitude of vibrations within the vehicle.

In accordance with an aspect of the invention, the means for providing a velocity signal and the means for providing a vibration signal each pass only those ranges of frequencies that are reliable indicators of vehicle motion while excluding spurious signals, such as those resulting from pyroelectric effects in the sensor and acoustic effects from passing trains.

In a preferred embodiment, the velocity signal is provided by integrating and band-passing the selected output signals from the piezoelectric transducer. In this embodiment, the vibration signal is provided by full-wave rectifying and band-passing the piezoelectric transducer output signal.

To enable a display of the detected state of motion for use by an operator, the motion detector is preferably adapted for integration into a system that monitors and remotely displays a plurality of train status conditions. According to this aspect of the invention, the motion detector includes means for repetitively monitoring the velocity signal and the vibration signal to obtain the values thereof, means for storing the values of the velocity and vibration signals, means for comparing the values of the vibration signal with a predetermined threshold to yield a signal indicative of a state of motion of the vehicle, and means for comparing preselected values of the velocity signal with a predetermined threshold to yield a signal that is indicative of a state of motion of the vehicle. In preferred form, the velocity signals are compared to provide signals that indicate forward and reverse commencement of motion of the vehicle, while the vibration signal is monitored to provide a signal that indicates that the vehicle has stopped moving.

According to a further aspect of the invention, when the vehicle is in motion, the values of the velocity signals are compared against predetermined variable thresholds to provide signals that indicate buff and draft states of motion.

In accordance with a further aspect of the invention, the effects of vibrations caused by onboard engines which tend to falsely indicate that a stopped vehicle is in motion are eliminated. This is accomplished through means which provide a "stopped" signal whenever the values of the velocity signals have changed by a predetermined absolute (e.g., by less than a fixed threshold) amount during a first predetermined interval (e.g., 20 seconds) and have changed in a predetermined fashion (e.g., monotonically) during a second predetermined interval (e.g., 50 seconds).

BRIEF DESCRIPTION OF THE DRAWINGS

The invention can be understood by the following portion of the specification taken in conjunction with the accompanying drawings in which.

DETAILED DESCRIPTION OF THE PREFERRED EMBODIMENT

Figure 1:
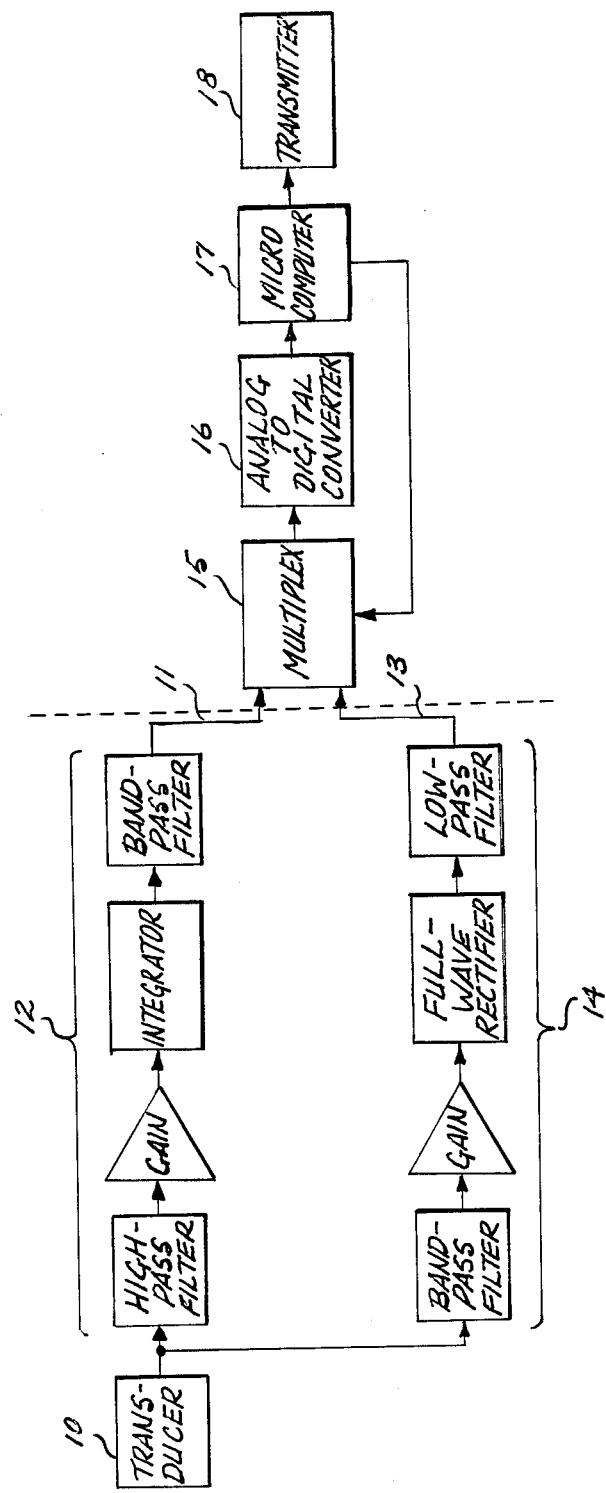
FIG. 1 is an electrical block diagram of a motion detector according to the invention connected to a microcomputer-based sensor/transmitter unit.

Referring to FIG. 1, the motion detector of the present invention includes a transducer 10, a velocity section 12, and a vibration section 14. As will be explained in greater detail hereinafter, the motion detector is mounted on a railway vehicle so that the transducer 10 produces an electrical output signal in response to vibrations within the vehicle and in response to acceleration of the vehicle. The velocity section 12 processes the transducer output signal to provide a velocity signal having a magnitude that is proportional to a change in velocity of the vehicle and having a polarity that is indicative of the direction of a change in the velocity. The vibration section 14 functions as a very high-sensitivity sensor to process the transducer output signal and provide a vibration signal that is proportional to the magnitude of vibrations within the vehicle. The velocity section and vibration section each include filters to permit passage of only respectively narrow bands of frequency.

While a number of arrangements may be employed to convert the information contained within the velocity and vibration signals into useful form for display to an operator, it is preferred that a microcomputer be utilized for these interpretive purposes. If desired, a "stand-alone" unit can be configured by providing a dedicated microcomputer system for exclusive use with the transducer and velocity and vibration sections. Such an arrangement would be employed where it is desired only to provide the operator with information concerning vehicle motion. In other situations, such as that of a locomotive-drawn train, it is particularly advantageous to provide the engineer with additional information concerning the operational status of important components of the train. A system for providing informational reports concerning train status conditions is disclosed in U.S. Pat. No. 4,487,060, issued Dec. 11, 1984, which is commonly assigned to applicant's assignee. The present invention is well adapted for modular construction and integration into the system disclosed in this pending application. Since this is the presently preferred arrangement the disclosure of that application is hereby incorporated by reference. In U.S. Pat. No. 4,487,060, the disclosed system, among other things, monitors and remotely displays the air pressure in the brake pipe of a railway train. The railway brake pressure monitor includes a remote display unit (RDU) mounted in the cab of a locomotive in a location that is accessible to the locomotive engineer, and a sensor/transmitter unit (STU) mounted on the rear coupler of the last vehicle of the train pulled by the locomotive. The RDU and the STU are each provided with antennas for providing radio frequency communications therebetween. The STU is coupled to the train's brake pipe at the rear of the last vehicle. The STU functions to measure the brake pipe air pressure in the brake pipe coupled thereto, to monitor various external status inputs provided by other sensors, and to transmit the measured brake pipe air pressure and monitored external status inputs, along with other information, to the RDU. The RDU, in turn, functions to display the data received from the STU and to provide various alerts and alarms, with the displays, alerts and alarms being provided in a manner designed to assist the locomotive engineer in use of the railway train braking system. The STU includes a pressure transducer, an electronic circuit board module, and a radio transmitter, each of which is powered by a battery pack. The electronic circuit board module includes a programmed microcomputer that functions to repetitively monitor the pressure transducer to measure the brake pipe air pressure, and to cause the radio transmitter to repetitively transmit reports including brake pipe air pressure, the states of the external status inputs and a battery status indication. Report transmission is triggered by various events, including changes in the brake air pressure and external status inputs since the last report. The remote display unit includes a radio receiver, a microcomputer, a display, an audible beeper, and a manually actuatable pushbutton. The RDU functions to receive the report and display the various information contained therein.

At periodic intervals, e.g., one-second intervals, the STU measures, converts to digital form, and stores the analog brake air pressure signal and reads and stores the various external status inputs. To effect the analog-to-digital conversion, the brake pressure signal is selectively coupled through an analog input multiplexer and switch to an analog-to-digital converter. To integrate the present motion detector into this system, the outputs of the velocity section and vibration section are selectively coupled to the analog-to-digital converter through the input multiplexer and switch. This arrangement is illustrated in FIG. 1, where the velocity signal on line 11 and the vibration signal on line 13 are fed as two of the analog inputs to multiplexer 15 (the other inputs thereto including the analog brake pressure signals). The analog signals are then converted to corresponding digital signals by the analog-to-digital converter 16 and provided as inputs to a microcomputer system 17. The microcomputer system 17 includes a central processing unit, a data memory, and a program memory that contains the set of program instructions to be executed by the central processing unit. To enable monitoring and use of the velocity and vibration signals generated by the motion detector, an additional set of program instructions is provided in the program memory. This set of instructions will be discussed in more detail hereinafter with reference to FIGS. 6 and 7A through 7C. In response to these program steps, the microcomputer system includes information concerning the condition of motion of the vehicle in the report that is transmitted to the RDU by the transmitter 18. The RDU, in turn, interprets and displays these motion conditions to the driver. As will be explained more fully hereinafter, the transmitted and displayed reports selectively include an indication of the following states of motion of the vehicle on which the detector and STU are mounted: FORWARD, REVERSE, MOVING, STOPPED, DRAFT, and BUFF.

Figure 4:
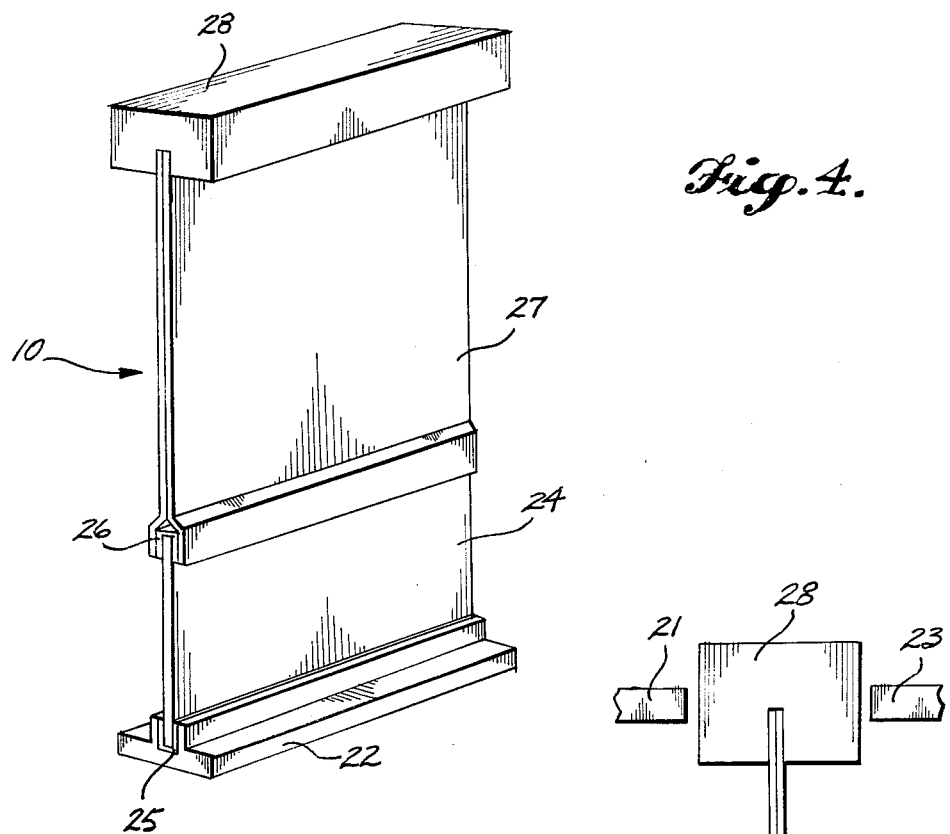
FIG. 4 is a perspective view of the transducer of the motion detector of FIG. 2.
Figure 5:
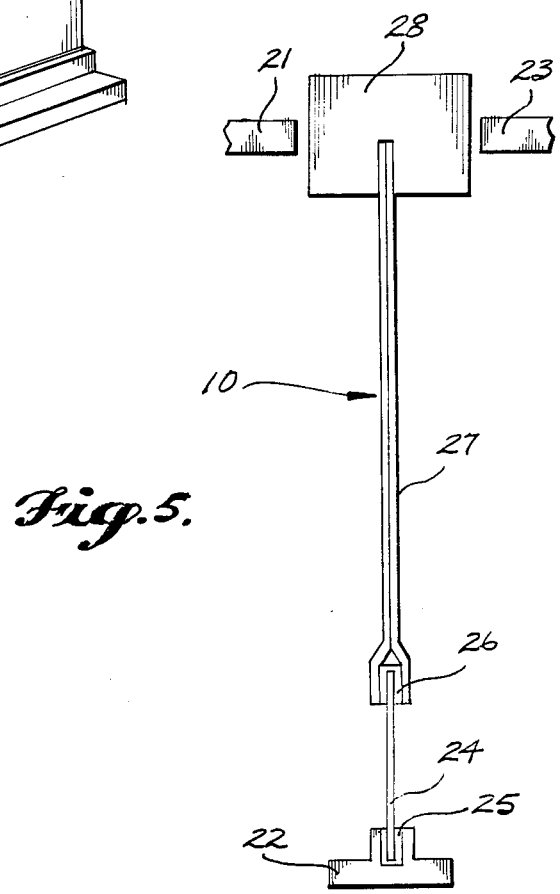
FIG. 5 is a side elevation view of the transducer of FIG. 2.

Referring now to FIGS. 4 and 5, the motion of, and vibration within, the vehicle upon which the motion detector is mounted are converted to an electrical output signal by transducer 10. A mounting base 22 is rigidly secured to the housing that contains the detector. This housing is, in turn, rigidly secured to the train so that vibrations and movements are transmitted to the transducer. A piezoelectric bender, or element 24 is mounted at its lower end into the base 22 through a spacer 25 of neoprene or similar resilient material. A similar spacer 26 connects the upper end of the piezoelectric bender to a cantilever element 27. A weighted mass 28 is mounted upon the outer end of the cantilever element 27 and permitted to freely move in response to vehicle motion along a path defined between a pair of stops 21 and 23. Preferably, the stops 21 and 23 limit movement of the free end of the cantilever element 27 to about ±1 millimeter. The piezoelectric bender is a laminate consisting of two ceramic slabs of lead zirconate-titanate about a central sheet of brass. The ceramic is nickel plated and bonded to the brass core with conductive epoxy. Wires (not shown) are attached to the two opposed outer surfaces of the piezoelectric bender and connected to the circuit shown in FIG. 2. Ideally, the cantilever element 27 and the mounting bass 22 have the same temperature coefficient of expansion as the piezoelectric bender. In operation, vibrations are transmitted to the piezoelectric bender through the mounting base 22 and spacer 25, while vehicle motion is transmitted to the piezoelectric bender by the action of the cantilever arrangement of the weighted mass 28 and cantilever element 27.

The piezoelectric transducer outputs a charge whose magnitude is proportional to acceleration and whose polarity depends upon the direction of acceleration. The load applied to the transducer is capacitive over the frequency range of interest so that the output charge is converted to a voltage proportional to acceleration.

Figure 2:
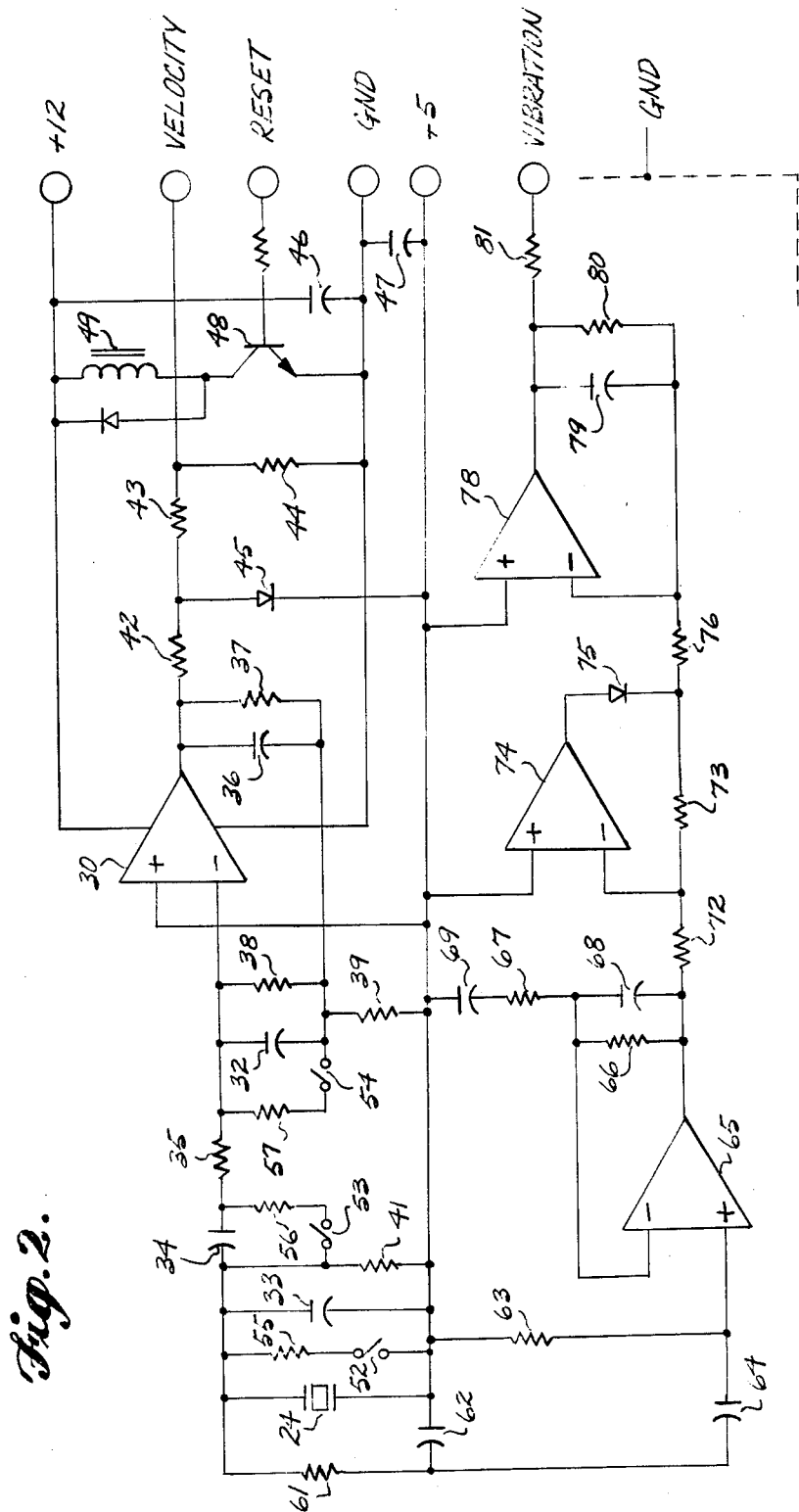
FIG. 2 is a detailed electrical schematic diagram of the motion detector.

Referring now to FIG. 2, the voltage produced by the piezoelectric bender 24 appears as a voltage source for the velocity and vibration sections of the circuit. While in the embodiment described here, only a single piezoelectric transducer provides the input signals for both the velocity and vibration sections of the circuit, it is to be understood that two separate transducers could be employed to produce independent inputs for each of these two sections. Those skilled in the art will readily appreciate how such transducers can be connected to the circuit of FIG. 2. As noted above, the velocity section 12 includes filters that pass only a narrow band of frequencies of the signals generated by the piezoelectric element. Since the voltage of the signals within this selected band of frequencies is proportional to acceleration, a signal corresponding to velocity change can be obtained by integrating these signals over a time interval. Thus, to derive a "velocity" signal that is indicative of velocity change, the filtered output of the piezoelectric element is applied to an integrator configured by providing an integrating capacitor 32 in the feedback loop of an operational amplifier 30. In order to have a true and accurate indication of velocity, it is necessary to ensure that the response of the velocity section remain linear over the frequency range of interest. The manner in which this is accomplished is best understood with reference to the idealized frequency response curves of FIG. 3. The curve designated A represents the approximate response of the velocity section of the motion detector. It has been empirically determined that the transducer output signals that fall within the range from about 0.01 Hz to about 1.0 Hz bear a direct relationship to railway vehicle movement, i.e., are indicative of a very slow change in the attitude of the train, which is substantially proportional to the true movement of the train. To obtain proportionality with the true velocity of the train in this critical region, the circuit is tailored so that the response is dominated by the $-6$ dB/octave characteristic of the integrator. Beyond the one-Hertz upper end of the selected frequency band, it is desirable to eliminate the high-frequency signals that can be caused by mechanical resonance within the piezoelectric element and high-frequency vibrations, such as acoustic vibrations caused by rough rails or passing trains. Accordingly, the response cuts in sharply to −12 dB/octave beginning at about 0.72 Hz and shallows out again beginning at about 36 Hz. At the lower end of the curve, it is necessary to eliminate op-amp offset and pyroelectric effects within the piezoelectric element. Provision must be made for eliminating these effects since the vibration sensor must, of necessity, be made very sensitive in order to detect the vibrations falling in the frequency range of interest that indicate motion. To eliminate these low-frequency signals, there is a rapid fall-off of the response at a +12 dB/octave rate. To avoid instability problems, the transition from the −6 dB/octave integrating region to the +12 dB/octave cutoff region, a double-pole cutoff is provided slightly below 0.01 Hz. These two series-connected cutoffs are provided by the combined effects of the capacitance of the piezoelectric element 24, capacitor 33, resistor 41, capacitor 34, and resistor 35. The cutoff at the upper end of the integrating range begins at about 0.72 Hz and is derived from the parallel combination of capacitor 36 and resistor 37 on the output of operational amplifier 30, which parallel combination feeds into the network consisting of feedback capacitor 32, resistor 38, and resistor 39 connected between the inverting input terminal of operational amplifier 30 and the +5 volt zero reference level for the velocity circuit.

At the output of operational amplifier 30, resistors 42, 43, and 44 lower the output swing by about 2:1. Diode 45 provides a limiting function by clamping the output to about 5.6 volts. Bypass capacitors 46 and 47 are provided between ground and the +12 volt and +5 volt supplies, respectively.

There are instances, however, in which a vehicle continues to vibrate even after coming to a complete standstill, e.g., when there are vibrations produced by an engine carried by the vehicle. Since, under such conditions, there is no cessation of vibrations, the vibration signal will continue to be at a level which indicates that the vehicle is still in motion. Thus, some indicator other than the vibration signal must be relied upon to determine that the vehicle is, in fact, stopped. In the present invention, the output of the velocity circuit, i.e., the velocity signal, is this other indicator.

In particular, reliance is placed upon a characteristically slow return of the velocity signal to "zero," i.e., a steady level, after a vehicle has ceased moving. Immediately prior to stopping, the velocity signal will usually be highly positive or highly negative. After stopping, the velocity signal may take on the order of 50 seconds to return to a steady level indicative of no motion. During its slow return, the velocity signal characteristically changes in a monotonic manner. As will be discussed again hereinafter in conjunction with the program flow charts, by monitoring this monotonic change over a 50-second interval an indication of a stop is reliably obtained even when the vehicle has an onboard source of vibrations.

Where a stop condition is indicated by vibration cessation, however, further monitoring of the velocity signal for 50 seconds is not necessary. Moreover, once the vehicle is known to have stopped, it is not desirable to wait 50 seconds before being able to obtain a true indication of velocity from the velocity circuit. Accordingly, the circuit includes a reset feature that short-circuits the three capacitors, 32, 33, and 34, which are responsible for the slow return of the circuit. To short these capacitors, a signal applied to the RESET input causes transistor 48 to conduct and energize relay 49. Relay 49 thereupon closes switches 52, 53, and 54 so as to place capacitors 33, 34, and 32 in parallel with resistors 55, 56, and 57 respectively. Resistors 55, 56, and 57 are preferably moderately large (e.g., one megohm) so that there is a moderately long time constant for charging and discharging. More particularly, these resistors are selected so that the time constant is long with respect to the period of mechanical vibrations, which produce the largest output from the transducer, but short with respect to the tolerated duration of a reset signal. This moderately long time constant is preferred in order to prevent large vibration spikes, as, for example, those caused by jerks of the train, from putting extra charge onto the capacitor, while at the same time allowing the charge on the capacitors to discharge when the RESET signal is applied. When a true stop condition is sensed, applying a RESET signal for one second permits sufficient discharge of capacitors 32, 33, and 34.

Since the velocity circuit provides only filtering and gain, it will be appreciated that the velocity signal output polarity corresponds to the polarity of the input signal obtained from the piezoelectric bender 24. Accordingly, within the frequency range of interest a change in velocity and the rate of change in velocity can be detected by measuring and comparing the value of the velocity signal at different points in time. As will be seen from the discussion below of the flow charts, the microcomputer is programmed to monitor these changes and determine whether the vehicle is in a forward, reverse, draft, or buff condition of motion.

Figure 3:
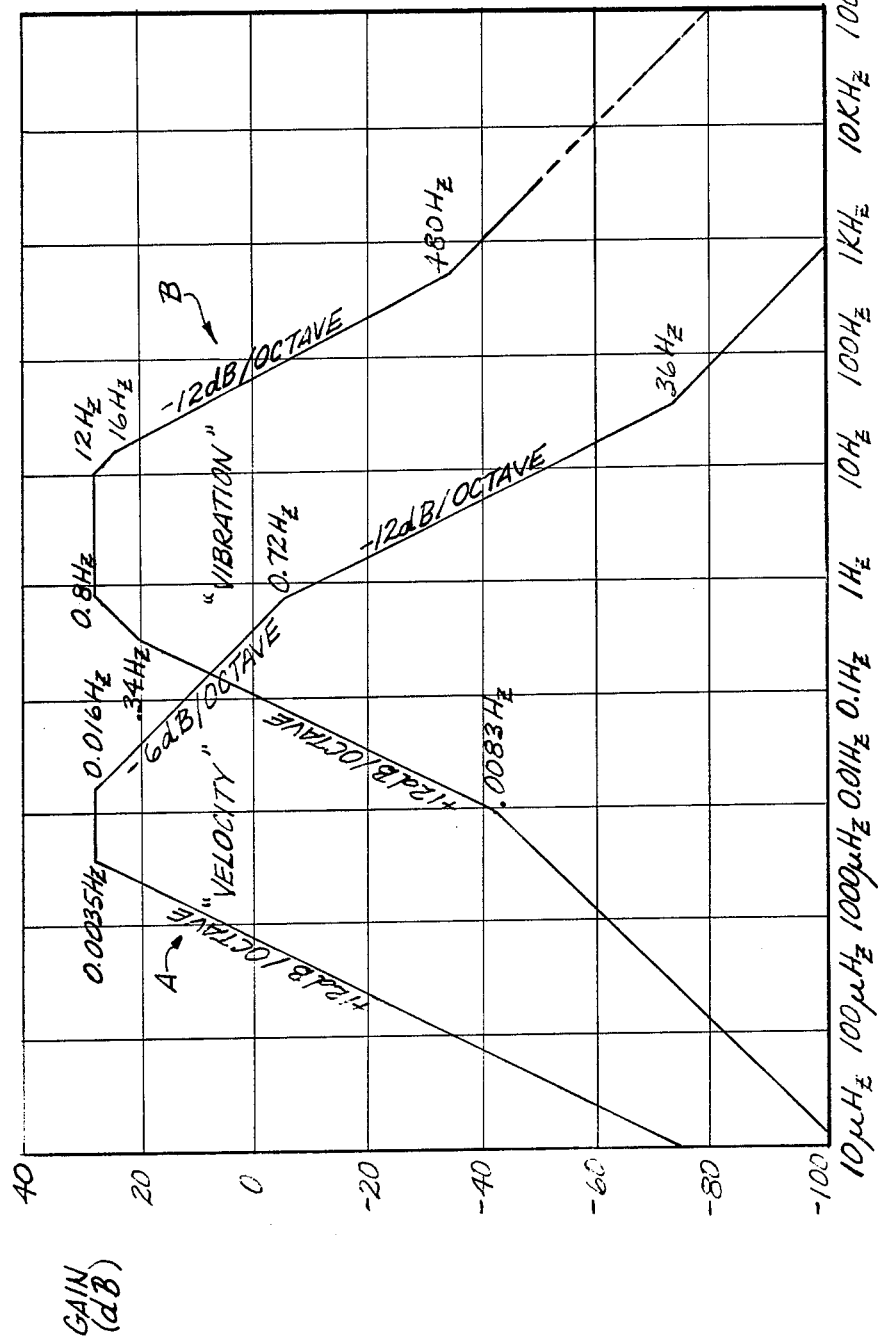
FIG. 3 is a diagram illustrating the idealized frequency response curves for the motion detector of FIG. 2.

Considering now the vibration section of the circuit, reference is again made to FIG. 2 and the idealized response curve designated B in FIG. 3. The frequency range of interest is from about 1 Hz to about 10 Hz. This range is obtained by sharply cutting off the response at 12 dB/octave slightly beyond the 1 Hz and 10 Hz limits. Frequencies within this range have been empirically determined to be attributable to train motion and, accordingly, provide a basis upon which a determination can be made as to whether the train is stopped or in motion. To select this range, the output of piezoelectric element 24 is fed through a low-pass filter comprising resistor 61 and capacitor 62, which provide an upper end cutoff at about 16 hz, and then through a high-pass filter comprising resistor 63 and capacitor 64, which provide a cutoff at about 0.8 Hz. The signal is then applied to a buffer amplifier 65 that provides a midrange gain of about 40 as a result of the selection of the values of resistors 66 and 67. At higher frequencies, capacitor 68 provides more feedback, lowering the gain and producing a cutoff at about 12 Hz. At lower frequencies, the effects of capacitor 69 lower the gain and provide a cutoff at about 0.34 Hz. The amplified signals within the selected band are then applied to a full-wave precision rectifier that includes operational amplifier 74 and diode 75 at the output thereof. Rectification is provided in the following manner. When the input voltage is positive, diode 75 is reverse biased so that the signal passes through resistors 72 and 73 to resistor 76 that is connected to the inverting input of operational amplifier 74. When a negative voltage signal is presented, diode 75 is forward biased and operational amplifier 74 operates in an inverting configuration. By selecting identical values for resistor 72 and 73, operational amplifier 74 has a unity gain. Thus, when a signal having a negative voltage appears, a positive replica thereof appears across resistor 76. Thus, a positive signal is always present at the start of resistor 76 regardless of whether a positive or negative voltage output is produced by the piezoelectric element 24. The fully rectified signal is finally fed through a low-pass filter comprising operational amplifier 78, capacitor 79, and resistor 80, and then is finally fed through resistor 81 and output as the vibration signal.

The Appendix is a table containing representative values of the resistors and capacitors utilized in the circuit of FIG. 2. The four operational amplifiers 30, 65, 74 and 78 may conveniently be contained within a single package as, for example, in a quad op-amp package sold commercially under the designation 7642. Diodes 45 and 75 may be of the type designated 1N4148, while transistor 48 may be of the 2N4401 type.

When the detector is in operation, the microcomputer system runs a motion detection routine once per second in order to sample the velocity and vibration signals and determine the current state of motion of the vehicle. This operation can best be understood by reference to the program steps undertaken by the microcomputer system, as will now be discussed in conjunction with the flow charts of FIGS. 6 and 7A through 7C.

Figure 6:
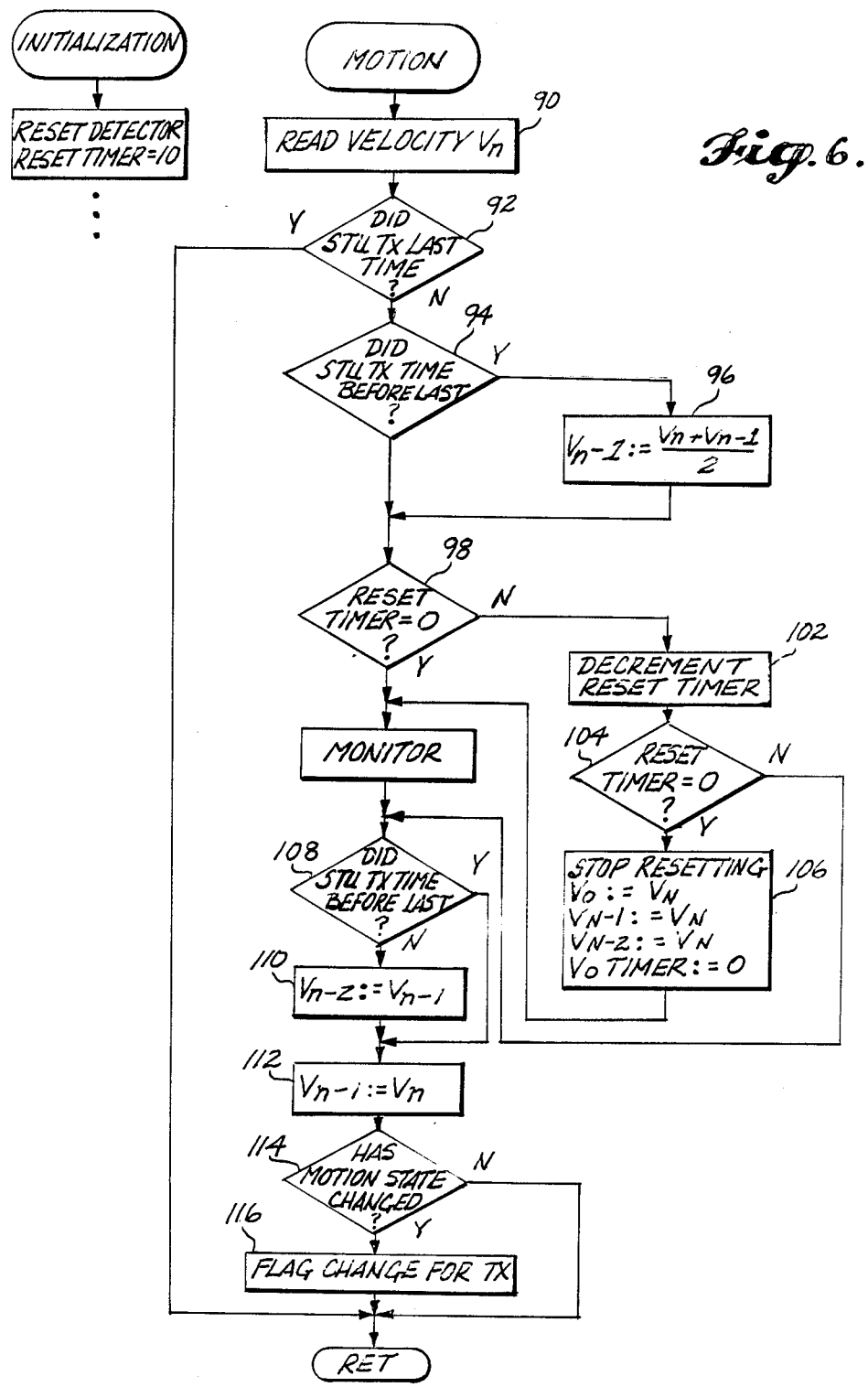
FIG. 6 is a flow chart illustrating the program steps undertaken by the microcomputer of the sensor/transmitter unit in a MOTION routine; and, FIGS. 7A through 7C are flow charts illustrating the program steps undertaken in the MONTOR subroutine of the MOTION routine illustrated in FIG. 6.

As explained in detail, in the above-referenced patent application, Ser. No. 495,714 and now U.S. Pat. No. 4,487,060, upon application of power to the sensor/transmitter unit (STU), the microcomputer system enters an INITIALIZE routine. As part of this initialization, the microcomputer sends a RESET signal to the motion detector for a ten-second interval so as to activate relay 49 and discharge capacitors 32, 33, and 34 in the manner described in conjunction with FIG. 2. This ten-second interval is provided by setting the reset timer to ten seconds. As mentioned previously, once per second, the microcomputer enters the MOTION routine (FIG. 6). In initial step 90, the microcomputer reads and stores the velocity signal present at the output of the velocity section of the circuit. In step 92 the microcomputer determines if the STU transmitted a report during the immediately preceding one-second interval. If the determination in step 92 is affirmative, the microcomputer exists the MOTION routine, returns to its other programmed tasks, and "waits" for another second before returning to the MOTION routine. This procedure is followed in order to ignore motion information (vibration and velocity signals) during the time that the transmitter is on in order to prevent the RF field from interfering unacceptably with the data sensed and developed by the motion detector.

If the determination in step 92 is negative, the microcomputer proceeds in step 94 to determine if the STU transmitted a report the time before last, i.e., two seconds ago. If the determination in step 94 is affirmative, the microcomputer proceeds in step 96 to average the present reading of the velocity signal ($V_n$) with the previous velocity reading $V_{n-1}$. This is done also for the purpose of ignoring transmission interference. After step 96, or if the determination in step 94 is negative, the microcomputer proceeds in step 98 to determine if the reset timer has expired. As previously discussed, the reset timer is set to ten seconds upon initialization of the STU. As also mentioned above, and as will be subsequently discussed, the reset timer is set to one second each time that it is determined that the car has stopped moving. If the reset timer has not yet expired, the microcomputer decrements this timer in step 102. In step 104, the microcomputer determines whether the reset timer has now expired. If the answer is affirmative, the microcomputer proceeds in step 106 to remove the RESET signal applied to transistor 48 (FIG. 2) so that relay 49 opens switches 52, 53, and 54 stopping the resetting of capacitors 32, 33, and 34. In step 106, the microcomputer also performs an initialization function by setting certain parameters that are used in the MONTOR routine (FIGS. 7A–7C), which contain the steps which determine the state of motion of the vehicle. In step 106, a parameter $V_o$ is set equal to the current value $V_n$ of the velocity signal that was read in step 90. $V_o$ represents a slowly moving baseline that drifts because of pyroelectric effects within the piezoelectric transducer. This drifting baseline is arbitrarily considered to be "zero motion" and designated $V_o$ for purposes of algorithms contained within the MONTOR routine. By initializing $V_o$ to the current velocity reading $V_n$, the "zero motion" reference point is fixed just before entering the MONTOR routine. Also in step 106, the two previous velocity signal readings are set equal to the current reading $V_n$. ($V_{n-1}$ being the reading during the previous second, and $V_{n-2}$ being the reading two seconds earlier.) Finally, in step 106, a 20-second timer, designated $V_o$ timer, which is used in the MONTOR routine is initialized to zero. After step 106, or if the determination in step 98 is affirmative, the microcomputer proceeds to the MONTOR routine.

Returning to step 104, if the reset timer has not yet expired, the microcomputer proceeds in step 108 to determine if the STU transmitted a report two seconds ago. If the determination in step 108 is negative, the microcomputer proceeds in steps 110 and 112 to update the values of $V_{n-2}$ and $V_{n-1}$. If the determination in step 108 is affirmative, the microcomputer proceeds to step 112 to update the value of $V_{n-1}$ equal to the current reading $V_n$ of the velocity signal in accordance with an assumption that a transmission may have occurred and interrupted the validity of the reading of the velocity signal. After step 112, the microcomputer proceeds in step 114 to determine if there has been a change in any of the various motion states that correspond to the conditions of motion displayed to the operator. These states and conditions of motion are determined by the MONTOR routine to be discussed hereinafter and consist of the following: FORWARD, REVERSE, MOVING, STOPPED, DRAFT, and BUFF. If the determination in step 114 is affirmative, the changed state is flagged in step 116 for subsequent transmission by the STU as part of its report to the RDU. Thereupon, the microcomputer returns to the main routine.

Figure 7A:
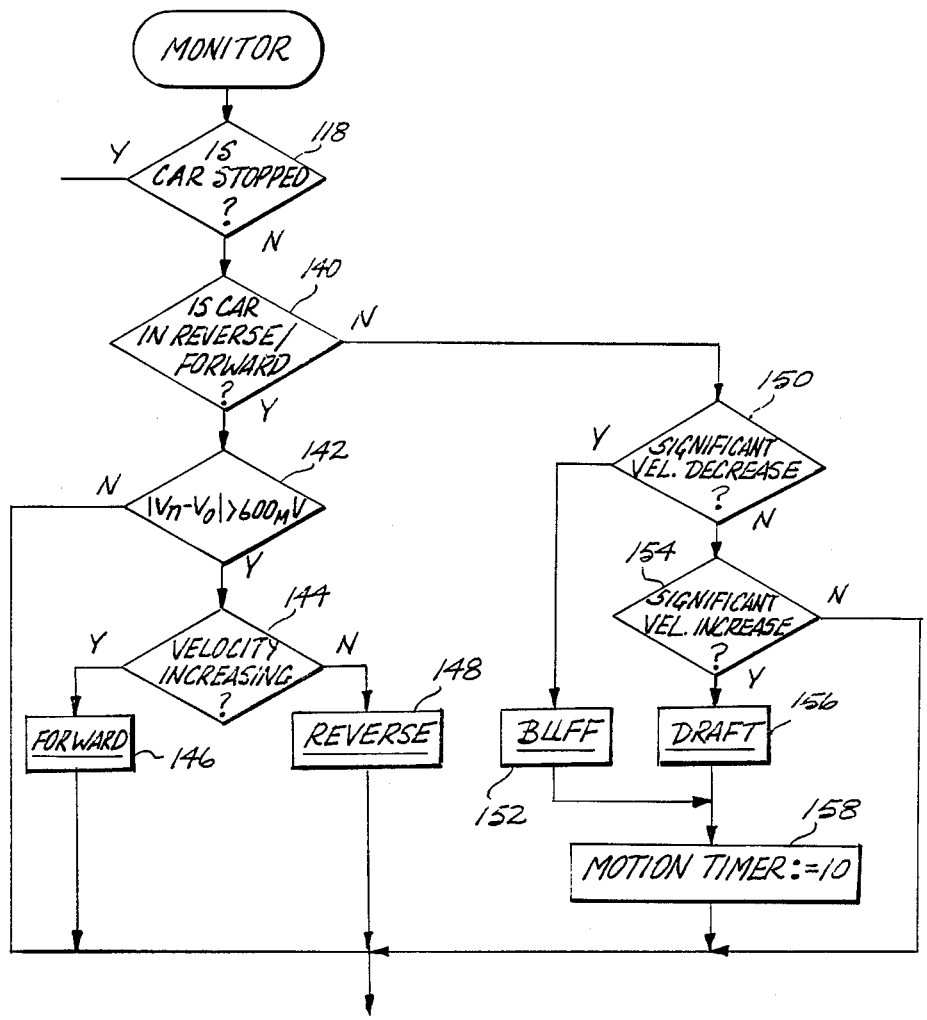
Figure 7B:
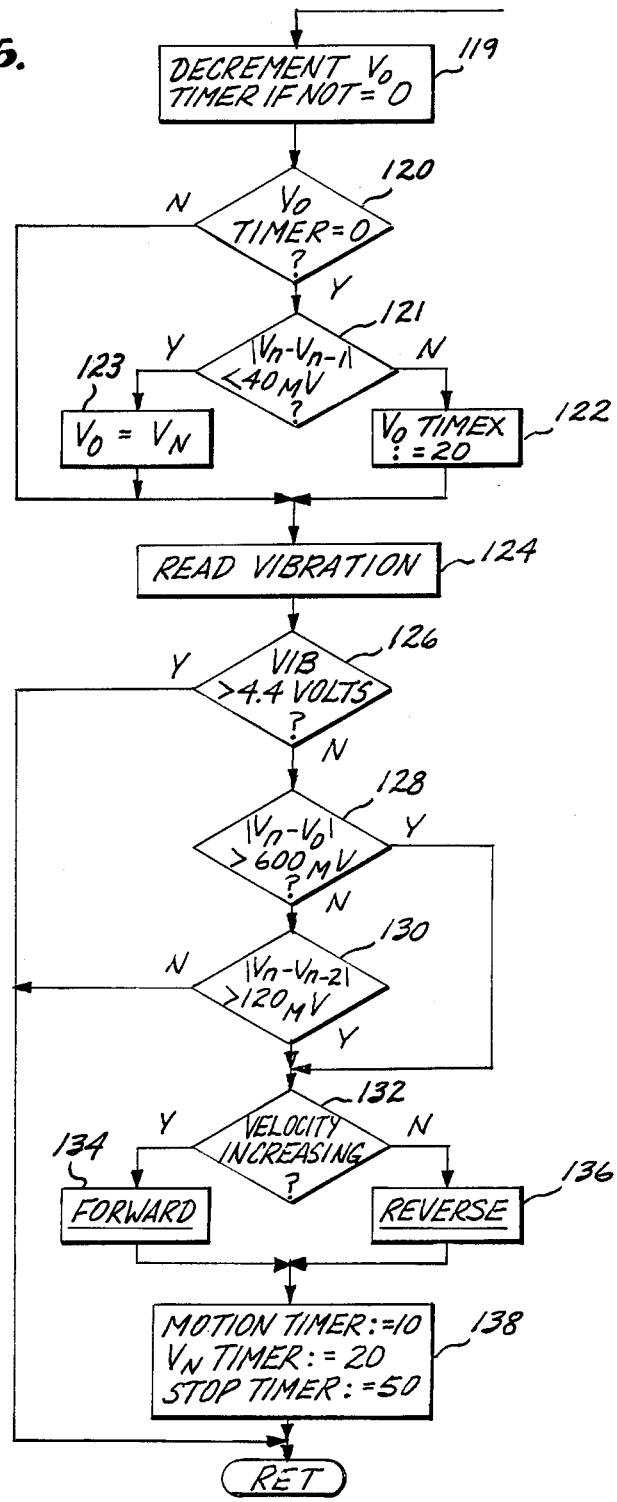

After completion of the capacitor reset cycle, i.e., following an affirmative determination in either of steps 98 or 104, the microprocessor enters the MONTOR routine (FIGS. 7A–7C) to monitor the vehicle motion and determine whether a change in motion has occurred. Referring now to FIG. 7A, the microcomputer first determines in step 118 if the presently stored motion state byte corresponds to the STOPPED state, indicating that the car is standing still, i.e., is in a condition of no motion. If the answer is affirmative, the microcomputer proceeds through a series of steps to track changes in the velocity signal in order to determine whether, and when, motion has commenced. It is within this series of steps that the 20-second $V_o$ timer is utilized to track changes in velocity and enable detection of rapid changes from forward to reverse as are caused, for example, by sudden stops and starts during initial operation of the vehicle from a still condition.

In step 119, the microcomputer decrements the $V_o$ timer if it is not equal to zero, then proceeds to step 120 to determine if the 20-second $V_o$ timer has expired. If the determination in step 120 is affirmative, the microcomputer proceeds to step 121 to determine whether there has been a rapid change in velocity over a recent interval, i.e., during the last second. This determination is made by comparing the absolute value of the change between the current reading $V_n$ of the velocity signal and the reading of $V_{n-1}$ one second ago against a predetermined threshold, in the illustrated arrangement 40 millivolts. A negative determination in step 121 indicates that there has been a large swing in velocity. Under these conditions, the microcomputer proceeds to step 122 and sets the $V_o$ timer to 20 seconds. This timer is set to 20 seconds so that, during the next cycle through the "stopped" loop of the MONTOR routine, (e.g., during the next second if the vehicle remains stopped) a negative determination will be made in step 120 and the microcomputer will proceed, beginning with step 124, to monitor the vibration and velocity changes to detect when the motion begins. Referring again to step 121, if no rapid change in velocity has occurred over the one-second interval, it is assumed that any drifts are attributable to pyroelectric effects or other spurious effects. Thereupon, the microcomputer proceeds in step 123 to set the baseline parameter $V_o$ equal to the current reading $V_n$ of the velocity signal. It will be seen that when there is only a slow change in the velocity, $V_o$ continues to be a slow, drifting baseline. This is allowed based upon the assumption that the drift is strictly attributable to pyroelectric (thermal) or spurious effects. As noted above, concurrent with the significant change in the velocity over a short period of time, it is assumed that motion is the dominant factor and that there will be no significant thermal changes within the next 20 seconds. In line with these events, the current velocity reading $V_n$ becomes the new baseline for the next 20 seconds.

From either a negative determination in step 120 or after completing steps 122 or 123, the microcomputer proceeds to read the vibration signal in step 124 and then determine in step 126 if the vehicle is vibrating. This is accomplished by comparing the current reading of the vibration signal against a predetermined threshold. Under the implemented conditions, if the vibration signal is greater than 4.4 volts, a "no vibration" condition is indicated and the determination in step 126 is affirmative. If, however, the vibration signal is less than 4.4 volts, vibrations are indicated and the determination in step 126 is negative. If the determination in step 126 is affirmative, the microcomputer exits the MONTOR routine and returns to the MOTION routine, proceeding to step 108. If, on the other hand, the determination in step 122 is negative, vibrations of the vehicle are indicated and the microcomputer proceeds in several steps to assess whether the velocity has changed significantly.

Two separate thresholds are checked to take into account the fact that railway vehicles may accelerate either rapidly or slowly from a standstill. Where the car is "jerked" into motion, acceleration is rapid. Where a series of interconnected cars are already "stretched" when they begin motion, the vehicles accelerate very gradually. To account for the rapid start condition, the values of the velocity signals occurring two seconds apart are compared to a relatively low threshold (120 millivolts) to determine motion. For the slow acceleration situation, a higher threshold (600 millivolts) is utilized so that thermal drift over the 20-second interval will not erroneously indicate a change in motion. The comparison of the velocity change against the higher threshold is made in step 128. A negative determination in step 128 causes the microcomputer to proceed to step 130 and compare the absolute value of the change in velocity over two seconds against the lower threshold. A negative determination in step 130 indicates that the vibrations indicated during step 126 are attributable to sources other than vehicle motion. Accordingly, the microcomputer returns to step 108 in the MOTION subroutine. If the determination in step 128 or 130 is affirmative, it indicates that the vehicle has begun movement. In order to assess whether the vehicle is moving in the forward or reverse directions, the microcomputer proceeds in step 132 to determine if the velocity is increasing. An affirmative determination indicates forward motion while a negative determination indicates movement in reverse. Thus, in response to the determination in step 132, the microcomputer proceeds in steps 134 and 136 to register the corresponding change in the motion state byte to indicate FORWARD or REVERSE. A motion timer, which controls the availability of these states for transmission and display purposes, is thereupon set for ten seconds in step 138. During this interval, an indication of the direction of movement of the vehicle, i.e., forward or reverse, is displayed for the engineer. The $V_n$ timer and stop timer are also reset for use elsewhere in the MONTOR routine. After setting these timers, the microcomputer returns to step 108 of the MOTION routine (FIG. 6).

Referring again to step 118 (FIG. 7A), if it is determined that the vehicle is not stopped, the microcomputer proceeds in step 140 to determine whether the vehicle has just started moving. This determination is made by examining the motion state byte for FORWARD and REVERSE motion indication that is made available for ten seconds in steps 134 and 136, respectively, in response to the determination of step 132. Since an affirmative determination in step 140 indicates that the vehicle has recently (i.e., within the last ten seconds) begun moving in the forward or reverse direction, a check is made to assess whether the velocity has changed significantly. This is done in order to provide the operator with an indication that there has been a rapid switch from forward to reverse directions of movement, or vice versa. As discussed earlier, it is not uncommon for such reversals in direction to occur during the initial phases of train operation. This determination of whether there has been a significant change in velocity is made in step 142, wherein the microcomputer compares the absolute value of the difference between the current velocity signal $V_n$ and the baseline value $V_o$ against a predetermined threshold, 600 millivolts in the illustrated implementation. If the determination in step 142 is negative, the microcomputer proceeds to step 162 (FIG. 7C). If the determination in step 142 is affirmative, this indicates that there may have been a change in the direction of motion of the vehicle during the initial ten seconds. Accordingly, the microcomputer proceeds in step 144 to determine whether the velocity is increasing or decreasing. An affirmative answer corresponds to an increase in the velocity and causes the microprocessor to proceed in step 146 to set the motion state byte for FORWARD motion so that an indication of forward motion can be reported to the operator. If the determination in step 144 is negative, i.e., the velocity is decreasing, the microcomputer proceeds in step 148 to set the motion state byte for REVERSE indication so that the operator may be apprised that the car is now going in the reverse direction. After completing either of steps 146 or 148, the microcomputer proceeds to step 162.

Referring again to step 140, a negative determination indicates that the car has not just started moving, i.e., it has been in motion for at least ten seconds. Thereupon, the microcomputer proceeds through steps that determine whether the moving vehicle is in either a buff or draft condition. In general, these determinations are made by assessing whether the velocity increments or decrements by a predetermined threshold amount within a limited time. In step 150, the microcomputer determines whether the velocity has decreased by more than a predetermined threshold within a predetermined interval. An affirmative answer indicates that the vehicle is in buff, whereupon the microcomputer proceeds to indicate this condition in step 152. The threshold against which the velocity change is measured is a variable threshold that depends upon the absolute apparent velocity at the moment. The threshold is variable because of the characteristic of the motion detector circuit to return naturally to zero, even if no true change in velocity occurs. The determination made in step 150 is given by the following formula:

$$(V_n - V_{n-1}) < -\left(144 + \frac{V_{n-1}}{16}\right),$$

in millivolts.

If the determination in step 150 is negative, the microcomputer proceeds to step 154 where it determines whether there has been a significant increase in velocity. For the reasons just discussed, this determination is also made against a variable threshold, given by the following formula:

$$(V_n - V_{n-1}) > \left(456 - \frac{V_{n-1}}{16}\right),$$

in millivolts.

An affirmative determination in step 154 indicates that the vehicle is in draft, and the microcomputer proceeds to indicate this event occurence in step 156. After completing step 152 or step 156, the microcomputer proceeds in step 158 to set the motion timer to ten seconds. It will be recalled that this motion timer controls the interval during which the changes in states of motion are available for transmission to the RDU and display to the operator. These states are FORWARD, REVERSE, BUFF, and DRAFT.

After following the steps of the MONTOR routine illustrated in FIG. 7A, the microcomputer proceeds to step 162 (FIG. 7C) and decrements the display-enabling motion timer, if it is not already equal to zero. This timer would not be equal to zero if there had been a recent change in any of the FORWARD, REVERSE, BUFF, or DRAFT state indicators corresponding to respective changes in the motion of the vehicle. After step 162, the microcomputer determines in step 164 whether the motion timer has expired. If ten seconds have transpired, the microcomputer proceeds in step 166 to cause the MOVING state indicator to be enabled. Since, with expiration of the ten-second motion timer, any of the FORWARD, REVERSE, BUFF, or DRAFT indicators will have been removed, the only message displayed to the driver is that the vehicle is in motion. Although ideally an indication of forward and reverse directions would be provided during on-road movement of the train, this information is usually of significance to the driver only immediately after commencement of motion. Also, for purposes of optimizing the reliability of the display, all display parameters are monitored on a continuing basis so that, if any "hard" or "soft" failure occurs, no resulting erroneous display has a duration of longer than a few seconds. Since the parameters involved in the determination of direction of motion are sensed only in the 10 seconds immediately subsequent to start up, the microcomputer is programmed to take away the indicators of direction after ten seconds and revert to an in-motion display.

If the determination in step 164 is negative, or after completing step 166, the microcomputer proceeds in step 168 to read the vibration signal. This step initiates an inquiry which is directed to ascertaining when the vehicle stops moving. The microcomputer proceeds in step 168 to first read the vibration signal and then, in step 170 to compare this signal with a predetermined threshold. In the implemented and illustrated arrangement, if the vibration signal exceeds the 4.4 volt threshold, this is an indication that there are "no vibrations". Thereupon, the microcomputer proceeds to step 172 to enable the STOPPED state indicator. The microcomputer then proceeds, in step 174, to set the reset timer at one second, which causes the output of a RESET signal that triggers the relay in the velocity circuit to close the switches and discharge the capacitors, as was previously discussed. After this, the microcomputer returns to step 108 (FIG. 6) in the MOTION routine. It will be seen that, as the microcomputer proceeds from step 108, the STOPPED state change will be recognized in step 114 and the same flagged, in step 116, for the next transmission.

Referring again to FIG. 7C, if the vibration signal does not exceed the predetermined threshold, the negative determination indicates that vibrations have been detected. As was noted above, where the subject vehicle includes an engine, such as one for the compressor of a refrigerator car, the possibility exists that the detected vibrations may be attributable to this source rather than to actual movement of the vehicle. To determine if this is the situation, the microcomputer proceeds through a series of steps that check the current reading of the velocity signal $V_n$ relative to known characteristics of the circuit. One of these characteristics is that, once the vehicle has been moving and then stops, the velocity signal runs monotonically toward zero over a reasonably long period of time. It is characteristic of the circuit that, for at least 50 seconds, the velocity output will drift in this monotonic fashion. Since this is a characteristic of a car that is "sitting still", the microcomputer is programmed to detect the monotonic change during a 50-second interval in order to indicate that the vibrating vehicle has, in fact, stopped.

Before inquiring as to possible monotonic change in the velocity signal, the microcomputer proceeds through steps that make an additional inquiry as to the possible saturation of the circuit. Since the velocity output of the motion detector is limited by the voltage available within the circuit, it is possible that, in a saturated state, a constant velocity signal would be provided, even though the velocity of the vehicle is actually changing significantly. Since such a constant value appears to be monotonic, measures are taken to discard this erroneous information. To determine whether the circuit is saturated, the microcomputer proceeds in step 171 to determine whether the velocity signal falls within a predetermined range. If not within this range, the microcomputer proceeds to step 173 and sets two timers that are used in this section of the program. As will be seen below, the 20-second $V_n$ timer is used to require that the velocity signal be within a predetermined narrow range for 20 seconds before making an affirmative determination that the vehicle has stopped. The 50-second stop timer is utilized to require that the velocity signal be monotonic for 50 seconds as a condition precedent to indicating that the vehicle is stopped. If the determination in step 171 is affirmative (i.e., the velocity signal is within range) or after completing step 173, the microcomputer proceeds in step 176 to decrement the $V_n$ timer if it is not already expired. Thereafter, in step 178 the microcomputer determines whether the $V_n$ timer has expired. If the determination is affirmative, i.e., the velocity signal has been within range for 20 seconds, the microcomputer proceeds to step 184 to begin the inquiry concerning monotonicity of the signal.

If the determination in step 178 is negative, the microcomputer proceeds in step 180 to determine whether, during the last second, the velocity has changed in absolute value relative to a narrowly defined threshold. If the determination in step 180 is affirmative, the microcomputer proceeds to step 184. A negative determination in step 180 causes the microcomputer to proceed in step 182 to again set the $V_n$ timer to 20 seconds and, thereafter, proceed to step 184. If the stop timer has not expired, the microcomputer decrements the same in step 184, then proceeds in step 186 to determine whether that timer has expired. A determination that the stop timer has not expired leads the microcomputer to step 190 to make the determination discussed above as to whether the velocity signal is changing monotonically in one direction. If the determination in step 190 is negative, the microcomputer proceeds in step 200 to set the stop timer again at 50 seconds, and thereafter to return to step 108 in the MOTION routine. If the 50-second stop timer has expired, an affirmative answer will be provided in step 186 and the microcomputer will then proceed in step 188 to determine whether the 20-second $V_n$ timer has also expired. If the $V_n$ timer has not yet expired, the microcomputer goes to step 190 and proceeds in the manner discussed above. If the $V_n$ timer has expired, the determination in step 188 will be affirmative and the microcomputer will proceed to set the STOPPED state indicator in step 172 and, thereafter, proceed in the same manner as if a stopped condition had been detected by sensing only vibrations (step 170).

The programming steps just described, in which the velocity signal is checked both as to possible saturation and monotonicity, are needed because of the possibility that the vehicle on which the motion detector is mounted may include an auxiliary engine. If the detector were mounted on a nonpowered vehicle then it would not be necessary to include these steps for checking velocity. Rather, the indication that a moving car has come to a stop could be determined solely by checking vibrations following the steps up through step 170 and then to steps 172 and 174.

From the foregoing, it will be appreciated that the invention provides a means for sensing railway vehicle vibrations and relative velocity and selecting therefrom critical bands of frequencies that are indicative of actual changes in movement of the vehicle. The invention further provides means for interpreting the sensed vibrations and velocity to determine when the vehicle has started moving or stopped, whether the vehicle has begun movement in a forward or reverse direction, whether the vehicle undergoes changes in direction during initial stages of movement, and whether the vehicle, when moving, is in buff or draft. In general, the motion detector monitors velocity to determine when a stopped vehicle begins movement and monitors vibration to provide an indication that a moving vehicle has stopped. As an additional check, velocity is also monitored in conjunction with the vibration monitoring for purposes of determining that a moving vehicle has come to rest. Changes in relative velocity, i.e., relative to the velocity during recent, preceding intervals are monitored to determine the direction of motion of a vehicle during those stages of operation of the vehicle in which knowledge of these conditions is of importance to the operator.

The invention may be used on any railway vehicle, either as a stand-alone unit or as part of a system that monitors a variety of operating conditions within the vehicle. As a result of its modularity, low power consumption, and ready adaptation into a microcomputer-based system, the invention is particularly suited for use as one component of a rear-of-train monitor and remote display system.

While the invention has been described with reference to a preferred embodiment, it is to be understood by those skilled in the art that the invention is not limited thereto, and that the scope of the invention is to be interpreted only in conjunction with the following claims.

APPENDIX

Component Values for FIG. 2. Numbers correspond with FIG. 2. C=Capacitor, R=Resistor.

| Component | Value |
|---|---|
| C32 | 100 n |
| C33 | 100 n |
| C34 | 220 n |
| R35 | 200 M |
| C36 | 100 n |
| R37 | 2.2 M |
| R38 | 100 M |
| R39 | 22 M |
| R41 | 180 M |
| R42 | 33 M |
| R43 | 10 M |
| R44 | 47 M |
| C46 | 100 n |
| C47 | 100 n |
| R55 | 1 M |
| R56 | 1 M |
| R57 | 1 M |
| R61 | 10 M |
| C62 | 1 n |
| R63 | 20 M |
| C64 | 10 n |
| R66 | 40 M |
| R67 | 1 M |

-continued

| Component | Value |
| --- | --- |
| C68 | 330 n |
| C69 | 470 n |
| R72 | 100 M |
| R73 | 100 M |
| R76 | 20 M |
| C79 | 100 n |
| R80 | 20 M |
| R81 | 10 M |

The embodiments of the invention in which an exclusive property or privilege is claimed are defined as follows:

I claim:

1. A motion detector adapted to be mounted on a railway vehicle comprising:
   means for providing an electrical output signal that is proportional to vibrations within the vehicle and proportional to the magnitude and direction of acceleration of the vehicle;
   velocity processing means for selecting those components of the output signal that have frequencies that fall within a first predetermined range of frequencies and for providing therefrom a velocity signal having a magnitude that is representative of a change in the velocity of the vehicle and having a polarity that is indicative of the direction of a change in velocity;
   vibration processing means for selecting those components of the output signal that have frequencies that fall within a second predetermined range of frequencies and for providing therefrom a vibration signal that is proportional to the magnitude of vibrations within the vehicle;
   means for repetitively monitoring said velocity signal and said vibration signal to obtain the values thereof;
   means for storing the values of said velocity signal and said vibration signal;
   means for comparing the values of said vibration signal with a predetermined threshold to provide a signal indicative of whether said vehicle is in motion along a track; and,
   means for comparing preselected values of said velocity signal with a predetermined threshold to provide a signal that is indicative of whether said vehicle is in motion along a track or moving in a predetermined direction along a track.

2. The motion detector of claim 1 wherein said means for comparing values of said velocity signals is operable to provide signals that indicate forward and reverse directions of motion of the vehicle by detecting whether said values have changed by a predetermined amount during a predetermined interval.

3. The motion detector of claim 2, wherein said means for comparing the values of said velocity signals is further operable to provide a signal that indicates that the vehicle started moving from a stopped state.

4. The motion detector of claim 3, wherein said means for comparing values of said vibration signal is operable to provide a signal that indicates that the vehicle has stopped moving.

5. The motion detector of claim 4, wherein said means for comparing values of said velocity signals is operable to provide signals that indicate buff and draft states of motion of the vehicle by detecting whether said values have changed relative to predetermined variable thresholds.

6. The motion detector of claim 5, further including means for providing a signal that indicates that the vehicle has stopped moving by detecting whether the values of said velocity signals have changed by less than a predetermined absolute amount during a first predetermined interval and have changed in a predetermined manner during a second predetermined interval.

7. The motion detector of claim 1, wherein said first predetermined band of frequencies is from about 0.01 Hz to about 1.0 Hz and wherein said second predetermined band of frequencies is from about 1.0 Hz to about 10 Hz.

8. A motion detector adapted to be mounted on a railway vehicle, comprising:
   a piezoelectric transducer, said piezoelectric transducer providing an electrical output signal in response to vibrations within, and acceleration of, the vehicle;
   a velocity circuit connected to receive said output signal, said velocity circuit including an integrator and means for passing components of said output signal that are within a first predetermined band of frequency;
   a vibration circuit connected to receive said output signal, said vibration circuit including a full-wave rectifier and means for passing components of said output signal that are within a second predetermined band of frequencies;
   means for repetitively monitoring said velocity signal and said vibration signal to obtain the values thereof;
   means for storing the values of said velocity signal and said vibration signal;
   means for comparing the value of said vibration signal with a predetermined threshold to provide a signal that is indicative of whether said vehicle is in motion along a track; and,
   means for comparing preselected values of said velocity signal with a predetermined threshold to provide a signal that is indicative of whether said vehicle is in motion along a track or moving in a predetermined direction along a track.

9. The motion detector of claim 8 wherein said means for comparing values of said velocity signals is operable to provide signals that indicate forward and reverse directions of motion of the vehicle by detecting whether said values have changed by a predetermined amount during a predetermined interval.

10. The motion detector of claim 9, wherein said means for comparing values of said velocity signals is further operable to provide a signal that indicates that the vehicle started moving from a stopped state.

11. The motion detector of claim 10, wherein said means for comparing values of said vibration signal is operable to provide a signal that indicates that the vehicle has stopped moving.

12. The motion detector of claim 11, wherein said means for comparing values of said velocity signals is operable to provide signals that indicate buff and draft states of motion of the vehicle by detecting whether said values have changed relative to predetermined variable thresholds.

13. The motion detector of claim 12, further including means for providing a signal that indicates that the vehicle has stopped moving by detecting whether the values of said velocity signals have changed by a predetermined absolute amount during a first predetermined interval and have changed in a predetermined manner during a second predetermined interval.

14. A motion detector adapted to be mounted on a railway vehicle comprising:
   means for providing a first electrical output signal that is proportional to the magnitude and direction of acceleration of the vehicle;
   a means for providing a second electrical output signal that is proportional to vibrations within the vehicle;
   velocity processing means for selecting those components of the first electrical output signal that have frequencies that fall within a first predetermined range of frequencies and for providing therefrom a velocity signal having a magnitude that is representative of a change in the velocity of the vehicle and having a polarity that is indicative of the direction of a change in velocity;
   vibration processing means for selecting those components of the second electrical output signal that have frequencies that fall within a second predetermined range of frequencies and for providing therefrom a vibration signal that is proportional to the magnitude of vibrations within the vehicle;
   means for repetitively monitoring said velocity signal and said vibration signal to obtain the values thereof;
   means for storing the values of said velocity signal and said vibration signal;
   means for comparing the values of said vibration signal with a predetermined threshold to provide a signal indicative of whether said vehicle is in motion along a track; and
   means for comparing preselected values of said velocity signal with a predetermined threshold to provide a signal that is indicative of whether said vehicle is in motion along a track or moving in a predetermined direction along a track.

* * * * *